Figure 1:
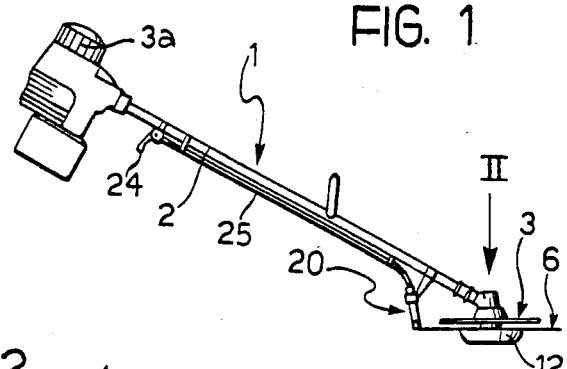

United States Patent [19]

Elia

[11] Patent Number: 4,916,813

[45] Date of Patent: Apr. 17, 1990

[54] UNIT FOR PROTECTING THE BLADE OF A ROTARY-BLADE SCRUB-CLEARING TOOL AND A SCRUB-CLEARING TOOL USING THE UNIT

[75] Inventor: Pietro Elia, Turin, Italy

[73] Assignee: Consiglio Nazionale Delle Ricerche, Rome, Italy

[21] Appl. No.: 292,154

[22] Filed: Dec. 30, 1988

[30] Foreign Application Priority Data

Dec. 31, 1987 [IT] Italy ................. 68151 A/87

[51] Int. Cl.4 .................. A01D 34/67; A01D 75/18
[52] U.S. Cl. ................... 30/276; 30/285; 30/390; 30/121; 56/174; 56/DIG. 20
[58] Field of Search ............. 30/276, 284, 285, 390, 30/391, 121, 166 R; 56/12.7, 17.4, 255, DIG. 9, DIG. 20, DIG. 24

[56] References Cited

U.S. PATENT DOCUMENTS

| | | | |
|---|---|---|---|
| 2,197,561 | 4/1940 | Orr | 30/276 X |
| 2,832,184 | 4/1958 | Beuerle | 30/276 X |
| 2,883,746 | 4/1959 | Gilsi | 30/276 X |
| 4,205,510 | 6/1980 | Raniero | 56/17.4 X |
| 4,586,322 | 5/1986 | Yokocho et al. | 56/12.7 |

Primary Examiner—Frank T. Yost
Assistant Examiner—Rinaldi Rada
Attorney, Agent, or Firm—Sughrue, Mion, Zinn, Macpeak & Seas

[57] ABSTRACT

In a scrub-clearing tool of the type comprising a tube, a blade supported for rotation at one end of the tube, a motor for driving the blade and transmission shaft for connecting the drive motor to the blade, a disc is provided for protecting the blade and is mounted for rotation on the shaft of the blade with the interposition of a bearing. The protective disc has a diameter larger than the outer diameter of the blade and has a plurality of recesses around its periphery, the inner edges whereof are spaced from the center of the disc by a distance less than the radius of the outer circumference of the blade. The protective disc is normally rotated together with the blade. It stops when it comes into contact with the ground or with some obstacle, while the blade can continue to rotate by virtue of the presence of the bearing. The disc therefore protects the blade from impacts with obstacles, protects the operator from accidental direct contact with the blade, and finally prevents the cutting of woody stems of a diameter greater than the width of the recesses. In fact, larger stems cannot penetrate these recesses and hence are not cut by the blade.

7 Claims, 1 Drawing Sheet

UNIT FOR PROTECTING THE BLADE OF A ROTARY-BLADE SCRUB-CLEARING TOOL AND A SCRUB-CLEARING TOOL USING THE UNIT

DESCRIPTION

The present invention relates to scrub-clearing tools of the type comprising a tube, a blade supported for rotation at one end of the tube, a motor for driving the blade and a transmission shaft for connecting the drive motor to the blade.

Tools of this type have some disadvantages which have not been resolved satisfactorily until now. In the first place there is the problem of protecting the operator and other people in the area in which the tool is being used from the risk of direct contact with the blade. In the second place there is a need to protect the blade from impacts with obstacles such as walls, rocks and the like so as to allow it to be used safely even in the immediate vicinity of such obstacles. Finally, there is the requirement, which is no less important than those mentioned above, of preventing the blade from damaging the stems of cultivated plants. For example, when the tool is being used along a row of vines to remove suckers and side-shoots from the stems of the vines, it is necessary at the same time to safeguard the integrity of the cultivated plants.

The object of the present invention is to produce a scrub-clearing tool which can fulfill all these requirements satisfactorily.

For this purpose, the invention provides a tool of the type indicated at the beginning of the present description, characterised in that a disc for protecting the blade is mounted for rotation on the shaft of the blade with the interposition of a bearing, the disc having a diameter larger than the outer diameter of the blade and a plurality of recesses around its periphery, the inner edges whereof are spaced from the center of the disc by a distance less than the radius of the outer circumference of the blade.

Since the diameter of the protective disc is larger than the outer diameter of the rotary blade, it prevents the operator from contacting the blade directly, as well as preventing direct contact between the blade and any obstacles. At the same time, the recesses in the protective disc have a selective function as regards the cutting. In fact, only material which can penetrate the recesses in the protective disc is cut whilst woody stems having diameters larger than the width of the recesses are preserved. When the protective disc is not in contact with the ground or with an obstacle it rotates, together with the blade, being driven by the bearing interposed between them so that the teeth defined between one recess and the next around the periphery of the disc cooperate with the blade in its cutting action. When the protective disc comes into contact with the ground or with an obstacle it stops whilst the blade continues to rotate, cutting the material situated in the recesses of the disc. For example, if it is necessary to operate along a wall, the edge of the protective disc can be held in contact with the wall and the tool can then be moved so that the protective disc rolls along the wall.

Another subject of the invention is a separate unit for protecting the blade of a scrub-clearing tool, including the protective disc described above and the bearing interposed between the disc and the shaft of the blade. Obviously, this unit could also be adapted for scrub-clearers not originally equipped therewith.

Figure 2:
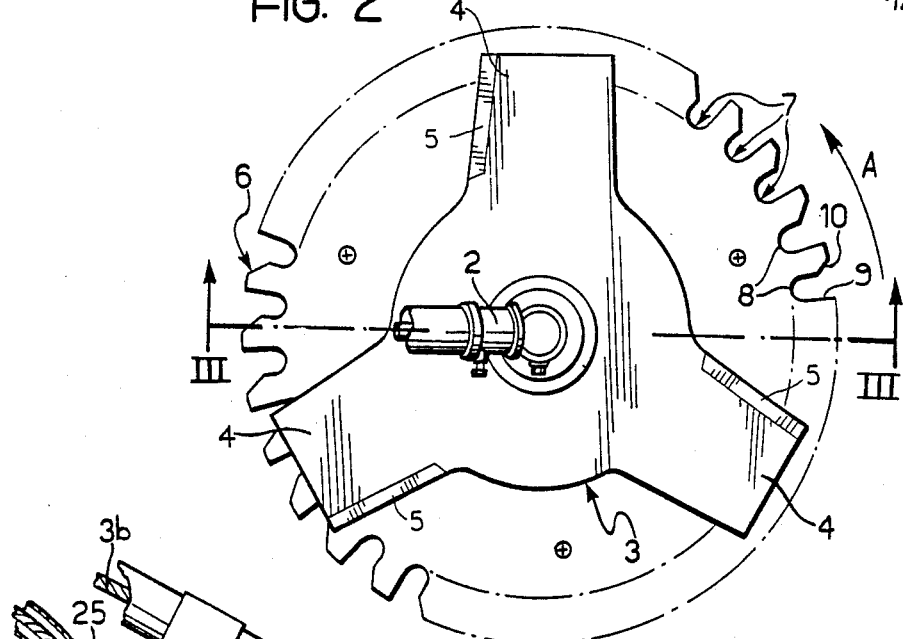
Figure 3:
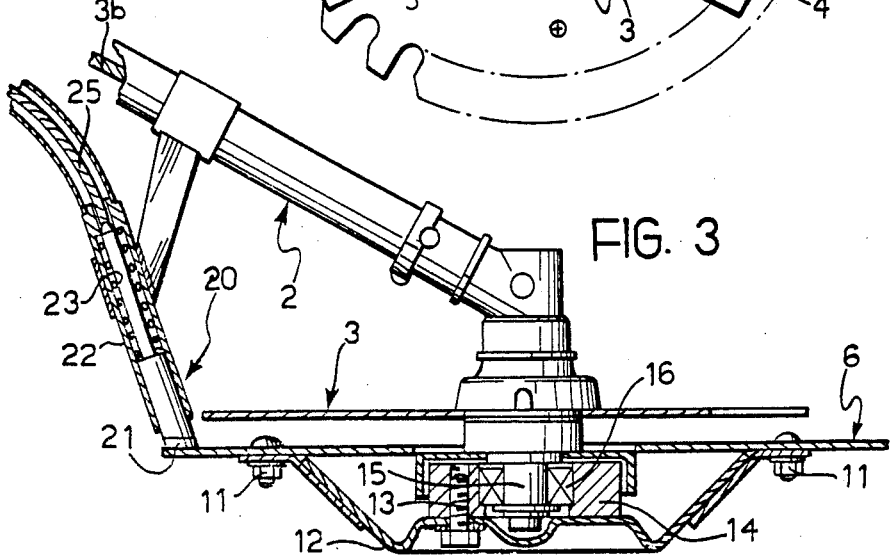

Further characteristics and advantages of the present invention will become clear from the detailed description which follows with reference to the appended drawings, provided by way of non-limiting example, in which:

FIG. 1 is a schematic side elevation of a scrub-clearing tool according to the invention, FIG. 2 is a view taken on the arrow II of FIG. 1, and FIG. 3 is a section taken on the line III—III of FIG. 2.

With reference to FIG. 1, a scrub-clearing tool is indicated 1 and includes a support tube 2, a rotary blade 3 supported for rotation by one end of the tube 2, and an internal combustion engine 3a carried by the other end of the tube 2. According to conventional techniques, a transmission shaft 3b (FIG. 3) is situated within the tube 2 and connects the engine 3a to the rotary blade 3. In the embodiment illustrated in FIG. 2, the blade is of the type which has three radial appendages 4 provided with cutting edges 5. Obviously, however, the invention can also be applied to any other type of blade. In conventional scrub-clearers, for example, circular, toothed blades are also used.

According to the invention, a protective disc 6 is provided immediately beneath the rotary blade 3, the disc being circular, having a diameter larger than the outer diameter of the blade and a plurality of recesses 7 in its periphery. Each recess 7 has an inner edge 8 which is spaced from the center of the disc by a distance less than the radius of the outer circumference of the blade 3. Moreover, in the embodiment illustrated, each recess 7 has a substantially radial edge 9 and an outwardly-inclined lead-in edge 10. More specifically, if the sense of rotation of the blade 3 is that indicated by the arrow A in FIG. 2, the radial edge 9 is the following edge with reference to the sense of rotation.

The protective disc 6 is fixed, for example by means of bolts 11 to (or is unitary with) a sheet metal bowl 12, the central part of which is in turn fixed by screws 13 (only one of which is visible in FIG. 3) to a hub 14. The hub 14 is mounted for rotation on a shaft 15 connected rigidly to the cutting blade 3 with the interposition of a bearing 16. In the embodiment illustrated, the bearing 16 is a roller bearing.

As already indicated in the introduction to the present description, the protective disc 6 is rotated together with the blade 3 by means of the bearing 16 when it is not braked by the ground or by some other fixed obstacle. When the bowl 12 is pressed on to the ground, however, or when the disc 6 comes into contact with a fixed obstacle such, as a wall or the like, the protective disc 6 stops whilst the blade 3 can continue to rotate by virtue of the presence of the bearing 16. The protective disc 6 prevents the blade 3 from contacting the body of the operator or obstacles directly whilst enabling material which can penetrate the recesses 7 to be cut. At the same time, it safeguards woody stems of a diameter larger than the width of the recesses. When the protective disc 6 is rotated with the blade 3, the radial edges 9 of the recesses 7 also act as cutting edges, thus cooperating with the blade in its cutting action.

Naturally, the unit constituted by the disc 6, the bowl 12, the hub 14 and the bearing 16 can also be adapted to a scrub-clearing tool not originally equipped therewith.

It is also possible to provide a slowing and locking device for the disc 6 for slowing or locking the disc 6 on command so as to enable it to be used safely without risk of damage to cultivated plants when the tool is used whilst being kept raised from the ground.

In the embodiment illustrated, a braking device 20 is provided which comprises a piston 21 with a tip of a material with a high coefficient of friction, the piston being supported within a cylinder 22 fixed to the tube 2 adjacent the blade 3. A spring 23 within the cylinder 22 urges the piston 21 towards an operative, braking position in which it contacts the disc 6. The piston 21 can be retained in an inoperative position spaced from the blade 3 by means of a control lever 24 (FIG. 1) connected to the piston 21 by a metal cable 25.

Naturally, the principle of the invention remaining the same, the constructional details and forms of embodiment may be varied widely with respect to those described and illustrated purely by way of example, without thereby departing from the scope of the present invention.

What is claimed is:

1. A scrub-clearing tool of the type comprising a tube, a blade having an outer diameter supported for rotation at one end of the tube, a motor for driving the blade and a transmission shaft for connecting the drive motor to the blade, wherein said tool further includes:
   a disc for protecting said blade mounted for rotation relative to said transmission shaft on a side of said blade opposite said drive motor and having a diameter larger than the outer diameter of said blade and defining a plurality of recesses around its periphery, said recesses having inner edges spaced from the center of said disc by a distance less than the radius of the outer circumference of said blade; and
   bearing means interposed between said transmission shaft and said disc, said bearing means supporting a hub for rotation on said transmission shaft with said hub carrying a sheet-metal bowl to which said disc is firmly fixed such that said disc is located immediately beneath said blade.

2. A scrub-clearing tool according to claim 1, wherein said bearing is a roller bearing.

3. A scrub-clearing tool according to claim 1, wherein said bowl is detachably connected to said hub.

4. A scrub-clearing tool according to claim 1, wherein said disc is detachably connected to said bowl.

5. A scrub-clearing tool according to claim 1, wherein each said recess is defined in part by a radial edge and an outwardly-inclined lead-in edge.

6. A unit for protecting the blade of a scrub-clearing tool of the type comprising a tube, a blade having an outer diameter supported for rotation at one end of the tube, a motor for driving the blade and a transmission shaft for connecting the drive motor to the blade, wherein said unit includes:
   a protective disc having a diameter larger than the outer diameter of said blade and defining a plurality of recess around its periphery, said recesses having inner edges spaced from the center of said disc by a distance less than the radius of the outer circumference of said blade; and
   mounting means for mounting said disc on said transmission shaft for rotation relative thereto on a side of said blade opposite said drive motor,
   wherein said mounting means includes a bearing mounted for rotation on said transmission shaft;
   a hub supported by said bearing; and
   a sheet-metal bowl secured to said hub, said protective disc being fixed to said bowl.

7. A unit according to claim 6, wherein brake means are provided for relatively slowing and locking said protective disc.

* * * * *